United States Patent
De Jong et al.

(10) Patent No.: US 6,673,270 B1
(45) Date of Patent: Jan. 6, 2004

(54) PROCESS FOR THE PREPARATION OF HYDROGEN AND CARBON MONOXIDE

(75) Inventors: Krijn Pieter De Jong, Amsterdam (NL); Coen Willem Johannes Pieterse, Amsterdam (NL); Ronald Jan Schoonebeek, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/529,293

(22) PCT Filed: Oct. 13, 1998

(86) PCT No.: PCT/EP98/06653

§ 371 (c)(1),
(2), (4) Date: Apr. 11, 2000

(87) PCT Pub. No.: WO99/19249

PCT Pub. Date: Apr. 22, 1999

(30) Foreign Application Priority Data

Oct. 14, 1997 (EP) .............................. 97308154
May 26, 1998 (EP) .............................. 98304141

(51) Int. Cl.⁷ ................................ C01B 3/26
(52) U.S. Cl. ...................... 252/373; 423/651
(58) Field of Search ...................... 252/373; 423/418.2, 423/651, 655, 656

(56) References Cited

U.S. PATENT DOCUMENTS

| | | | |
|---|---|---|---|
| 4,087,259 A | | 5/1978 | Fujitani et al. ................. 48/212 |
| 4,115,074 A | | 9/1978 | Yoshida et al. ................. 48/95 |
| 4,844,837 A | * | 7/1989 | Heck et al. ................... 252/373 |
| 4,897,253 A | | 1/1990 | Jenkins ........................ 423/651 |
| 5,149,464 A | | 9/1992 | Green et al. ................. 252/373 |
| 5,338,488 A | * | 8/1994 | Choudhary et al. .......... 252/373 |
| 5,510,056 A | | 4/1996 | Jacobs et al. ................. 252/373 |
| 5,628,931 A | * | 5/1997 | Lednor et al. ............... 252/373 |
| 5,741,440 A | * | 4/1998 | Cooper et al. ............... 252/373 |
| 5,762,658 A | | 6/1998 | Edwards et al. ............ 48/127.7 |
| 5,929,286 A | * | 7/1999 | Krumpelt et al. ............ 568/383 |

FOREIGN PATENT DOCUMENTS

| | | | |
|---|---|---|---|
| EP | 0 303 438 A2 | 2/1989 | .............. C01B/3/38 |
| EP | 0 262 947 B1 | 6/1992 | .............. C01B/3/38 |
| EP | 0 656 317 A1 | 6/1995 | .............. C01B/3/40 |
| WO | 92/11199 | 7/1992 | .............. C01B/3/40 |

OTHER PUBLICATIONS

P.D.F. Vernon, M.L.H. Green, A.K. Cheetham, A.T. Ashcroft; "Partial Oxidation of Methane to Synthesis Gas"; *Catalysis Letters* 6 (1990) 181–186.

R.H. Jones, A.T. Ashcroft, D. Waller, A.K. Cheetham, J.M. Thomas, "Catalytic Conversion of Methane to Synthesis Gas Over Europium Iridate, $Eu_2Ir_2O_7$: An In Situ Study By X–Ray Diffraction and Mass Spectrometry", *Catalysis Letters* 8 (1991) 169–174.

J.K. Hochmuth, "Catalytic Partial Oxidation of Methane Over A Monolith Supported Catalyst"; *Applied Catalysis B: Environmental*, 1 (1992) 89–100.

Chemical Abstracts, vol. 94, p 160, 1981, No. 142357m.

A.T. Ashcroft, A.K. Cheetham, J.S. Foord, M.L.H. Green, C.P. Grey, A.J. Murrell, P.D.F. Vernon; "Selective Oxidation of Methane to Synthesis Gas Using Transition Metal Catalysts", *Nature* vol. 344, pp. 319–321 (Mar. 22, 1990).

D.A. Hickman and L.D. Schmidt; "Synthesis Gas Formation By Direct Oxidation of Methane Over Pt Monoliths"; *Journal of Catalysis*, 138, 267–282 (1992).

* cited by examiner

Primary Examiner—Stanley S. Silverman
Assistant Examiner—Edward M. Johnson

(57) ABSTRACT

A catalytic partial oxidation process for the preparation of hydrogen and carbon monoxide from an organic feedstock, which process comprises contacting the organic feedstock and an oxygen-containing gas, in amounts giving an oxygen-to-carbon ratio of from 0.3 to 0.8, with a catalyst at a gas hourly space velocity in the range of from 100,000 to 10,000,000 Nl/kg/h, in which process the organic feedstock used is a feedstock containing hydrocarbons and/or oxygenates, which feedstock is liquid under conditions of standard temperature and pressure and has an average carbon number of at least 6.

17 Claims, No Drawings

PROCESS FOR THE PREPARATION OF HYDROGEN AND CARBON MONOXIDE

The invention relates to a process for the preparation of hydrogen and carbon monoxide by the catalytic partial oxidation of appropriate feedstocks.

The partial oxidation of gaseous hydrocarbons, in particular methane or natural gas, in the presence of a catalyst is an attractive route for the preparation of mixtures of carbon monoxide and hydrogen, normally referred to as synthesis gas. The partial oxidation of gaseous methane is an exothermic reaction represented by the equation:

$$2CH_4 + O_2 \rightarrow 2CO + 4H_2$$

There is literature in abundance on the catalysts and the process conditions for the catalytic partial oxidation of, in particular, methane. Reference is made, for instance, to EP-A-303 438, EP-B-262 947, U.S. Pat. No. 5,149,464, International patent application publication No. WO 92/11199 and to publications by D A Hickman and L D Schmidt ("Synthesis Gas Formation by Direct Oxidation of Methane over Pt Monoliths", J of Catal. 138, 267–282, 1992), A T Ashcroft et al. (Selective oxidation of methane to synthesis gas using transition metal catalysts", Nature, vol. 344, No. 6264, pages 319–321, $22^{nd}$ March, 1990), P D F Vernon et al ("Partial Oxidation of Methane to Synthesis Gas", Catalysis Letters 6 (1990) 181–186), R H Jones et al. ("Catalytic Conversion of Methane to Synthesis Gas over Europium Iridate, $EU_2Ir_2O_7$", Catalysis Letters 8 (1991) 169–174) and J K Hockmuth ("Catalic Partial Oxidation of Methane over a Monolith Supported Catalyst", Applied Catalysis B: Environmental, 1 (1992) 89–100), and EP-A-656 317.

In EP-A-656 317 the catalytic partial oxidation of methane at high gas hourly space velocities, i.e. in the range of from 20,000 to 100,000,000 $h^{-1}$, is mentioned.

It will be clear that because of the H/C atomic ratio of methane (4), it is the best feedstock when large amounts of hydrogen are to be produced. When considering other sources for producing hydrogen it will be clear that hydrocarbons having more than 1 carbon atom have a lower H/C ratio which makes them less ideal.

Moreover, there is a well-known tendency of hyrocarbons having more than 1 carbon atom to be susceptible to the pyrolitic production of carbon rather than producing optimal amounts of $H_2$ and CO. This tendency becomes more pronounced as the number of carbon atoms in the hydrocarbon molecule increases. Apart from this tendency to form pyrolytic carbon, higher hydrocarbons also suffer from the intrinsic properties that mixtures of such hydrocarbons with air are very unstable and may lead to pre-emission ignition which is highly undesired.

Further, it is well-known that carbon deposits may also be caused by catalytic reactions and, again, this tendency will be more pronounced subjecting higher hydrocarbons to catalytic processes.

The catalytic partial oxidation of hydrocarbons which are liquid under conditions of standard temperature and pressure to hydrogen and carbon monoxide has been disclosed in U.S. Pat. No. 4,087,259. Liquid hourly space velocities (LHSV), i.e. litres hydrocarbon per litre catalyst per hour, of from 2 to 20 $h^{-1}$ are exemplified, which is equal to a gas hourly space velocity of up to 75,000 $h^{-1}$ for a mixture of air and gasoline. It is explicitly mentioned that a LHSV greater than 25 $h^{-1}$ will result in incomplete partial oxidation and thus in a lower yield.

In EP-A-262 947 the catalytic partial oxidation of hydrocarbons having 1 to 15 carbon atoms is disclosed. For methane, GHSV's of up to 42,500 $h^{-1}$ are described. It is mentioned in EP-A-262 947 that for higher hydrocarbons a lower GHSV will be chosen than for hydrocarbons having a lower number of carbons. For hexane, very low throughputs, i.e. 6.25 and 12.5 g/h, are exemplified. These throughputs correspond, with GHSV's below 1,000 Nl/kg/h. For a oxygen-to-carbon ratio in the range of from 0.3 to 0.8, the hexane conversion is, even at these low throughputs, below 80%.

The aim of the present invention is to provide a process for the preparation of hydrogen and carbon monoxide from organic feedstocks that are liquid under conditions of standard temperature and pressure (25° C. and 1 atm) at a very high yield, while avoiding the accumulation of carbon deposits on the catalysts.

Surprisingly, it has now been found that these requirements can be fulfilled by performing a catalytic partial oxidation process with organic feedstocks that are liquid under conditions of standard temperature and pressure at an oxygen-to-carbon ratio in the range of from 0.3 to 0.8 and at very high gas hourly space velocities.

Accordingly, the present invention relates to a catalytic partial oxidation process for the preparation of hydrogen and carbon monoxide from an organic feedstock, which process comprises contacting the organic feedstock and an oxygen-containing gas, in amounts giving an oxygen-to-carbon ratio of from 0.3 to 0.8, with a catalyst at a gas hourly space velocity in the range of from 100,000 to 10,000,000 Nl/kg/h, in which process the organic feedstock used is a feedstock containing hydrocarbons and/or oxygenates, which feedstock is liquid under conditions of standard temperature and pressure and has an average carbon number of at least 6.

The average carbon number can be calculated by a summation of the carbon number times the mole fraction for all fractions. Thus, the average carbon number n is defined as:

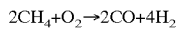

$$n = \Sigma n_i \cdot x_i$$

wherein $n_i$ is the carbon number of a fraction i and $x_i$ is the mole fraction of fraction i.

In particular, the feedstocks to be used in the process according to the present invention contain hydrocarbons or mixtures of hydrocarbons boiling in the range of from 50° C. to 500° C., preferably in the range between 60° C. and 350° C. Suitable feedstocks comprise kerosene feedstocks boiling between 150° C. and 200° C., synthetic gasoil feedstocks boiling between 200° C. and 500° C., in particular between 200° C. and 300° C. The hydrocarbons to be used may be derived from biomass, such as for example biodiesel.

In order to measure the suitability of the feedstocks to be used in the process according to the invention, it may be useful to refer to the smoke point of the feedstock envisaged since the smoke point of the feedstock is an indication of the propensity of the feedstock towards the generation of carbonaceous deposits.

In general, smoke points (as determined by ASTM-D 1322-96) of more than 15 are representative of the feedstock for the catalytic partial oxidation. Preferred feedstocks have a smoke point of at least 18, more preferred above 25 whilst feedstocks having a smoke point of more than 60 such as synthetic gasolines (e.g. as produced via the Shell Middle Distillate Synthesis process can be suitably applied).

Another indication of the propensity of the feedstock towards the generation of carbonaceous deposits is the content of sulphur and metals such as Ni or V in the feedstock. Suitably, the sulphur content of the feedstock used in the process of the invention is below 150 ppm, preferably below 100 ppm. The content of Ni or V is suitably below 0.2 ppm, preferably below 0.1 ppm.

It is possible to have hydrocarbonaceous material present in the feedstocks to be used in the process according to the present invention which are gaseous under standard conditions of temperature and pressure provided the requirements of the feedstock being liquid under standard conditions of temperature and pressure and having an average carbon number of at least 6 are still met.

Hydrocarbons which are liquid under standard conditions of temperature and pressure contain up to 25 carbon atoms in their molecules.

The process according to the present invention can also be carried out when the feedstock contains oxygenates being liquid under standard condition of temperature and pressure and having an average carbon number of at least 6.

Oxygenates to be used as (part of) the feedstock in the process according to the present invention are defined as molecules containing apart from carbon and hydrogen atoms at least 1 oxygen atom which is linked to either one or two carbon atoms or to a carbon atom and a hydrogen atom.

Examples of suitable oxygenates are alkanols, ether, acids and esters having between 6 and 25 carbon atoms and being liquid under standard conditions of temperature and pressure.

Also mixtures of hydrocarbons and oxygenates as defined hereinbefore can be used as feedstock in the process according to the present invention. Both hydrocarbon feedstocks and oxygenate-feedstocks (and their mixtures) may contain oxygenates having less than 6 carbon atoms such as methanol, ethanol, dimethyl ether and the like, provided the requirements of the feedstocks being liquid under standard conditions of temperature and pressure and the average carbon number of the feedstock being at least 6 are met.

The feedstock to be used in the process according to the present invention is contacted with an oxygen-containing gas during the partial oxidation process.

Air may be used as the oxygen-containing gas, in which case nitrogen will be present in the feed and reaction mixture in large quantities. Alternatively, substantially pure oxygen or oxygen-enriched air may be used.

The feed may optionally comprise steam.

The feed normally comprises the hydrocarbon and/or oxygenate feedstock and oxygen in an amount sufficient to give a oxygen-to-carbon ratio in the range of from 0.3 to 0.8, preferably from 0.45 to 0.75. Oxygen-to-carbon ratios of the stoichiometric ratio, 0.5, that is in the range of from 0.45 to 0.65 are particularly preferred. References to the oxygen-to-carbon ratio refer to the ratio of oxygen in the form of molecules ($O_2$) to carbon atoms present in the hydrocarbon and/or oxygenate feedstock.

If steam is present in the feed, the steam-to-carbon ratio (that is the ratio of molecules of steam ($H_2O$) to carbon atoms in the hydrocarbon) is preferably in the range of from above 0.0 to 3.0, more preferably from above 0.0 to 2.0.

The process according to the present invention may be operated at any suitable pressure. Preferably, the catalytic partial oxidation process is operated at elevated pressures, that is pressures significantly above atmospheric pressure. The process may be operated suitably at pressures in the range of from 2 to 50 bar. Preferably, the operating pressure is in the range of from 3 to 30 bar, more preferably in the range of from 5 to 20 bar. References in this specification to 'bar' are to 'bar absolute'.

The catalytic partial oxidation process may be operated at any suitable temperature. Under the preferred conditions of high pressure prevailing in the catalytic partial oxidation process, the feed molecules are typically allowed to contact the catalyst at elevated temperatures in order to achieve the level of conversion required for a commercial scale operation. Accordingly, the process is preferably operated at a temperature of at least 800° C. Preferably, the operating temperature is in the range of from 800 to 1500° C., more preferably in the range of from 800 to 1350° C. Temperatures in the range of from 850 to 1300° C. are particularly suitable. Reference herein to temperature is to the temperature in the top (i.e. the upstream side) layer of the catalyst.

The oxygen-containing gas is provided during the catalytic partial oxidation process at gas space velocities (expressed as normal litres (i.e. litres at 0° C. and 1 atm.) of gas per kilogramme of catalyst per hour) which are in the range of from 100,000 to 10,000,000 Nl/kg/hr, preferably in the range of from 200,000 to 3,000,000 Nl/kg/hr, more preferably in the range of from 400,000 to 3,000,000 Nl/kg/hr. Space velocities in the range of from 500,000 to 1,500,000 Nl/kg/hr are particularly suitable.

Catalyst compositions suitable for use in the catalytic partial oxidation of gaseous hydrocarbons as known in the art can also be applied in the catalytic partial oxidation of hydrocarbons and/or oxygenates in accordance with the present invention. Such catalysts generally comprise, as active component, a metal selected from Group VIII of the Periodic Table of the Elements. References in this specification to the Periodic Table of the Elements are to the CAS version, as published in the CRC Handbook of Chemistry and Physics, 68 th Edition. Catalysts for use in the process of the present invention comprise, as the catalytically active component, a metal selected from rhodium, iridium, palladium and platinum.

Catalysts comprising rhodium, iridium or platinum are particularly suitable catalysts. Iridium containing catalysts are most preferred.

The catalytically active metal is most suitably supported on a carrier. Suitable carrier materials are well known in the art and include the refractory oxides, such as silica, alumina, titania, zirconia and mixtures thereof. Mixed refractory oxides, that is refractory oxides comprising at least two cations may also be employed as carrier materials for the catalyst. Also metals, preferably in the form of gauzes, can be suitably applied as carrier material.

The catalytically active metal may be deposited on the carrier by techniques well known in the art. A most suitable technique for depositing the metal on the refractory carrier is impregnation, which technique typically comprises contacting the carrier material with a solution of a compound of the catalytically active metal, followed by drying and calcining the resulting material. For metal gauzes, dip-coat techniques may be used.

The catalyst may comprise the catalytically active metal in any suitable amount to achieve the required level of activity. Typically, the catalyst comprises the active metal in an amount in the range of from 0.01 to 20% by weight, preferably from 0.02 to 10% by weight, more preferably from 0.1 to 7.5% by weight.

The preferred reaction regime for use in the process is a fixed bed reaction regime, in which the catalyst is retained within a reaction zone in a fixed arrangement. If desired a fluidised bed, in which the catalyst is employed in the form of particles fluidised by a stream of gas can be used.

The fixed arrangement may be in the form of a fixed bed of catalyst particles, retained using fixed bed reaction techniques well known in the art. Alternatively, the fixed arrangement may comprise the catalyst in the form of a monolithic structure. A most preferred monolithic structure comprises a ceramic foam. Suitable ceramic foams for use in the process are available commercially. Alternative monolithic structures include refractory oxide honeycomb monolith structures. Further, alternative forms of the fixed arrangement include arrangements of metal gauzes or wires.

During the process, in accordance with the present invention, the feedstock and the oxygen-containing gas are preferably contacted with the catalyst under adiabatic conditions. For the purposes of this specification, the term "adiabatic" is a reference to reaction conditions in which substantially all heat loss and radiation from the reaction zone is prevented, with the exception of heat leaving in the gaseous effluent stream of the reactor.

Hydrogen or a mixture of hydrogen with other gases, prepared by the process of this invention may be particularly suitable for use as a combustible fuel, either directly or indirectly.

The process of this invention could very suitably be used to provide the hydrogen feed for a fuel cell. In fuel cells, hydrogen and oxygen are passed over the fuel cell's catalyst in order to produce electricity and water. Fuel cell technology is well known in the art. Fuel cells are known to provide an environmentally-friendly source of energy.

It is preferred to enrich the synthesis gas in hydrogen and to substantially remove the carbon monoxide present, prior to using synthesis gas as a hydrogen source for fuel cells. Suitable methods to achieve this are known in the art. An example is the removal of carbon monoxide, possibly together with other non-hydrogen synthesis gas components, by membrane separation. Another suitable method is pressure swing adsorption (PSA). It is particularly preferred to increase the hydrogen content of the synthesis gas by means of a water gas shift reaction:

$$CO + H_2O \rightarrow CO_2 + H_2$$

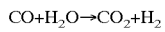

The carbon dioxide thus-obtained may be removed by methods known in the art, for example membrane separation or PSA. The residual carbon monoxide can suitably be removed by selective oxidation or, together with the carbon dioxide, by membrane separation.

Accordingly, the present invention also relates to a process to generate electrical energy comprising the following steps:
(a) the preparation of a mixture of hydrogen and carbon monoxide from an organic feedstock according to the process of this invention; and
(b) the conversion of at least part of the hydrogen prepared in step (a) into electrical energy and water in a fuel cell.

Preferably, prior to the conversion of at least part of the hydrogen in step (b), the mixture of hydrogen and carbon monoxide prepared in step (a) is enriched in hydrogen by means of a water gas shift reaction, optionally followed by removal of carbon dioxide. More preferably, the residual carbon monoxide is substantially removed from the hydrogen-enriched mixture of hydrogen and carbon monoxide by other methods than a water gas shift reaction. Such methods are well known in the art. Alternatively, the mixture of hydrogen and carbon monoxide prepared in step (a) is enriched in hydrogen by removal of carbon monoxide by methods other than water gas shift reaction.

In a further aspect, the invention relates to an electrical-energy generating system, wherein during operation electrical energy is generated by the electricity-generating process according to this invention.

Fuel cells are very suitable to apply in transport means, in particular automotive vehicles or crafts. Accordingly, another aspect of the present invention relates to transport means provided with the electrical-energy generating system of this invention.

EXAMPLE 1 a) Preparation of catalyst 0.1 g iridium (IV) chloride hydrate (IrCl$_4$·H$_2$O containing 53% wt of Ir ex Chempur) was dissolved in 1 g water. The solution obtained was used to impregnate 1.0 g of Yttrium Partial Stabilized Zirconia (Y-PSZ, commercially available having 650 pores per square centimeter). The impregnation was carried out in three steps with drying (at a temperature of about 100° C.) in between. After the last impregnation, the material was calcined in air (1 hour at 700° C.) to decompose the iridium chloride.

b) catalytic experiment
Synthetic kerosene having a boiling range of from 150° C. to 200° C. and having a smoke point >50 mm was sprayed into an air stream using a nozzle consisting of two concentric capillaries, the nozzle mouth was mounted 2 centimeters away from the catalyst bed containing 0.87 g of the catalyst prepared according to part a) which catalyst was present in a quartz tube having an internal diameter of 12 mm. The catalyst bed volume was 1.13 ml.

The experiment was carried out at a pressure of 3 bara. Kerosene was fed to the catalyst bed at a rate of 112,3 g/hour (154 ml/h) and air at a rate of 470 Nl/hour. The GHSV (Gaseous Hourly Space Velocity) of the air amounted to 540,000 Nl/kg catalyst/hour. The experiment was carried out at a O$_2$/C ratio of 0.55.

Light-off of the experiment was achieved by co-feeding hydrogen and igniting by use of an infra-red lamp. The temperature of the top of the catalyst bed stayed at about 1250° C.

The kerosene conversion amounted to 95%. The hourly yield amounted to 4.8 10$^3$ mol per kg of catalyst for carbon monoxide and to 3.7 10$^3$ mol per kg of catalyst for hydrogen. Under the operating conditions no carbon build-up was visually observed.

EXAMPLE 2 a) Preparation of catalyst
11.5 g of a zirconium nitrate solution containing 14.6 wt % Zr was added to 2.1 g iridium (IV) chloride hydrate (IrCl$_4$·H$_2$O containing 53% wt of Ir ex Chempur). The solution obtained was used to impregnate 20.00 g of 30–80 mesh particles of Yttrium Partial Stabilized Zirconia (Y-PSZ, commercially available having 650 pores per square centimeter). The impregnation was carried out in four steps with drying (20 minutes at a temperature of about 140° C.) in between. After the last impregnation, the material was calcined in air (2 hour at 700° C.). The resulting catalyst contained 4.7 wt % Ir and 7.1 wt % Zr based on the weight of the catalyst.

b) catalytic experiment
Synthetic kerosene having a boiling range of from 150° C. to 200° C. and having a smoke point >50 mm was sprayed into an air stream using a nozzle consisting of two concentric capillaries, the nozzle mouth was mounted 2 centimeters away from the catalyst bed containing 1.23 g of the catalyst prepared according to part a) which catalyst was present in a quartz tube having an internal diameter of 6 mm. The catalyst bed volume was 0.6 ml.

The experiment was carried out at a pressure of 3 bara. Kerosene was fed to the catalyst bed at a rate of 158 g/hour (216 ml/h) and air at a rate of 600 Nl/hour. The GHSV (Gaseous Hourly Space Velocity) of the air amounted to 490,000 Nl/kg catalyst/hour. The experiment was carried out at a $O_2/C$ ratio of 0.51.

Light-off of the experiment was achieved by co-feeding hydrogen and igniting by use of an infra-red lamp. The temperature of the top of the catalyst bed stayed at about 1250° C.

The kerosene conversion amounted to 94%. The hourly yield amounted to 5.6 $10^3$ mol per kg of catalyst for carbon monoxide and to 5.4 $10^3$ mol per kg of catalyst for hydrogen. Under the operating conditions no carbon build-up was visually observed.

What is claimed is:

1. A catalytic partial oxidation process for the preparation of hydrogen and carbon monoxide from an organic feedstock, which process comprises contacting the organic feedstock and an oxygen-containing gas, in amounts giving an oxygen-to-carbon ratio of about 0.3 to about 0.8, with a catalyst at a gas hourly space velocity of about 100,000 to about 10,000,000 Nl/kg/h, in which process the organic feedstock used is a feedstock containing hydrocarbons and/or oxygenates, which feedstock is liquid under conditions of standard temperature and pressure and has an average carbon number of at least 6.

2. The process of claim 1, in which the feedstock has an average carbon number in the range of 6 to 25.

3. The process of claim 1, in which the hydrocarbon feedstock has a boiling range of about 50° C. to about 500° C.

4. The process of claim 3, in which the feedstock comprises a kerosene feedstock boiling between 150° C. and 200° C.

5. The process of claim 3, in which the feedstock comprises a synthetic gasoil boiling between 200° C. and 500° C.

6. The process of claim 1, in which the feedstock comprises an alkanol or an ether.

7. The process of claim 1, in which the feedstock and the oxygen-containing gas are present in amounts giving an oxygen-to-carbon ratio of 0.45 to 0.75.

8. The process of claim 1, in which the feedstock is contacted with the catalyst at a pressure of about 2 to about 50 bar.

9. The process of claim 1, in which the feedstock is contacted with the catalyst at a temperature of about 800 to about 1500° C.

10. The process of claim 1, in which the oxygen-containing gas is contacted with the catalyst at a gas hourly space velocity of about 200,000 to about 3,000,000 Nl/kg/hr.

11. The process of claim 1, in which the catalyst comprises rhodium or iridium.

12. The process of claim 1, in which the catalyst is retained in a fixed arrangement.

13. The process of claim 1, in which the feedstock is contacted with the catalyst under substantially adiabatic conditions.

14. The process of claim 1, in which at least part of the feedstock is present in the form of visible droplets before entering into contact with the catalyst.

15. A process to generate electrical energy comprising the following steps:

(a) preparing a mixture of hydrogen and carbon monoxide from an organic feedstock using the process of claim 1; and (b) converting at least part of the hydrogen prepared in step (a) into electrical energy and water by means of a fuel cell.

16. The process of claim 15, wherein at least part of the mixture of hydrogen and carbon monoxide prepared in step (a) is enriched in hydrogen by means of a water gas shift reaction, optionally followed by removal of carbon dioxide.

17. The process of claim 15, wherein at least part of the carbon monoxide is removed from the (hydrogen-enriched) mixture of hydrogen and carbon monoxide by means other than a water gas shift reaction.

* * * * *